United States Patent
Karlsson

(10) Patent No.: US 10,375,903 B2
(45) Date of Patent: Aug. 13, 2019

(54) TREE FELLING WEDGE GIVING TREE FELLING ALERT

(71) Applicant: HUSQVARNA AB, Huskvarna (SE)

(72) Inventor: Mattias Karlsson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/089,606

(22) PCT Filed: Mar. 29, 2017

(86) PCT No.: PCT/EP2017/057364
§ 371 (c)(1),
(2) Date: Sep. 28, 2018

(87) PCT Pub. No.: WO2017/167781
PCT Pub. Date: Oct. 5, 2017

(65) Prior Publication Data
US 2019/0110411 A1    Apr. 18, 2019

(30) Foreign Application Priority Data
Mar. 31, 2016 (SE) ...................................... 1650421

(51) Int. Cl.
*A01G 23/099* (2006.01)
*G08B 21/18* (2006.01)

(52) U.S. Cl.
CPC ......... *A01G 23/099* (2013.01); *G08B 21/182* (2013.01)

(58) Field of Classification Search
CPC ........................... A01G 23/099; G08B 21/182
See application file for complete search history.

(56) References Cited

U.S. PATENT DOCUMENTS

| 3,590,760 | A | * | 7/1971 | Boyd | A01G 23/085 144/24.13 |
| 3,754,582 | A | * | 8/1973 | Emerson | A01G 23/099 144/336 |
| 3,945,610 | A | * | 3/1976 | Solie | A01G 23/08 254/93 R |
| 4,451,024 | A | * | 5/1984 | Shepherd | A01G 23/099 144/195.7 |
| 4,848,424 | A | * | 7/1989 | Wiemeri | A01G 23/091 144/34.1 |

(Continued)

FOREIGN PATENT DOCUMENTS

| CA | 1143255 A | 3/1983 |
| DE | 20 2007 006 030 U1 | 7/2007 |

(Continued)

OTHER PUBLICATIONS

International Type Search Report for Swedish Application No. 1650421-9 dated Nov. 1, 2016.

(Continued)

*Primary Examiner* — Ryan W Sherwin
(74) *Attorney, Agent, or Firm* — Burr Forman McNair

(57) ABSTRACT

A tree felling wedge (100) comprising at least one pressure sensor (110), an alert interface (130) and a controller (120) is provided. The controller (120) is configured to activate said tree felling wedge (100) in a tree felling monitoring mode, detect a pressure level, detect a release in said pressure level (R) indicating the falling of a tree and in response thereto provide an alert through said alert interface (130).

15 Claims, 4 Drawing Sheets

(56) References Cited

U.S. PATENT DOCUMENTS

| | | | | |
|---|---|---|---|---|
| 5,290,012 | A | * | 3/1994 | Cottriel .................. B66F 19/00 |
| | | | | 144/195.7 |
| 5,398,577 | A | * | 3/1995 | Pierce .................. A01G 23/099 |
| | | | | 144/335 |
| 2008/0230150 | A1 | | 9/2008 | Van Bortel |
| 2015/0352738 | A1 | | 12/2015 | Gregg |

FOREIGN PATENT DOCUMENTS

| | | |
|---|---|---|
| DE | 10 2014 010 021 A1 | 1/2016 |
| EP | 1 757 184 A1 | 2/2007 |
| JP | 2008-065720 A | 3/2008 |
| WO | 2011/038743 A1 | 4/2011 |
| WO | 2011/141636 A1 | 11/2011 |
| WO | 2016/028164 A1 | 2/2016 |

OTHER PUBLICATIONS

International Search Report and Written Opinion for International Application No. PCT/EP2017/057364 dated Jun. 27, 2017.
International Preliminary Report on Patentability for International Application No. PCT/EP2017/057364 dated Oct. 2, 2018.

* cited by examiner

TREE FELLING WEDGE GIVING TREE FELLING ALERT

TECHNICAL FIELD

This application relates to a tree felling wedge for increasing safety during tree felling and in particular to a tree felling wedge for providing a tree felling alert.

BACKGROUND

It is a well-known problem that during tree felling there is often little or no warning as to when the tree actually starts falling. Not only is this of concern for the logsman working on the tree to be felled, but also for any logsmen (or other persons) in the vicinity. The same is true for cutting down lamp posts, electric poles and the like.

Traditionally, the logsman must follow strict safety protocols including establishing an escape route, and giving oral warnings ("TIMBER!") as to when the tree starts to fall.

However, not all warnings are heard by all persons, and also, sometimes the warning is given too late as the logsman may be distracted by something or the tree starts falling before the logsman expected it to fall thereby catching the logsman off guard—who may be busy retrieving further tree felling wedges or other tools.

There is thus a need for an improved manner of "sounding" or giving an alert as to when a tree that is being felled starts to fall.

SUMMARY

It is an object of the teachings of this application to overcome the problems listed above by providing a tree felling wedge which eliminates or at least diminish the problems listed above.

This is achieved by providing a tree felling wedge comprising at least one pressure sensor, an alert interface and a controller. The controller is configured to activate said tree felling wedge in a tree felling monitoring mode, detect a pressure level, detect a release in said pressure level indicating the falling of a tree and in response thereto provide an alert through said alert interface.

The controller may further be configured to detect said release by determining that the pressure level has fallen by a threshold amount.

The controller may further be configured to detect said release by determining that the pressure level is decreasing at a rate exceeding a rate threshold.

The controller may further be configured to activate said tree felling wedge by detecting a pressure that is greater than a threshold pressure level.

The controller may further be configured to activate said tree felling wedge by detecting a rapid pressure increase, wherein the increase is above a threshold level.

The controller may further be configured to activate said tree felling wedge by detecting a pressure increase to a pressure level exceeding a threshold pressure level.

The tree felling wedge may comprise more than one pressure sensor, wherein the controller is further configured to detect a release by determining a release in all or at least a majority of the corresponding pressure sensor.

The controller may further be configured to detect a release by detecting a release for the corresponding pressure sensors in a specific order.

The controller may further be configured to to start detecting a release after a time has lapsed.

The controller may further be configured to reset any ongoing alert should a new activation be detected.

The tree felling wedge may further comprise a strike activator configured to detect strikes being exerted on the tree felling wedge, wherein said strike activator is configured to absorb power from a strike and deliver this as a charging current to a battery.

The controller may further be configured to activate the tree felling wedge based on the strike activator detecting a strike.

The tree felling wedge may further comprise a strike activator configured to detect strikes being exerted on the tree felling wedge, wherein said controller is further configured to activate the tree felling wedge based on the strike activator detecting a strike.

It is also an object of the teachings of this application to overcome the problems listed above by providing a tree felling alert system. The tree felling alert system comprises at least one tree felling wedge according to the teachings herein. The tree felling wedge comprises a radio frequency interface as part of the alert interface and said tree felling alert system further comprising an external device comprising a radio frequency interface for communicatively connecting said tree felling wedge for receiving an alert.

It is also an object of the teachings of this application to overcome the problems listed above by providing a method for use in a tree felling wedge. The tree felling wedge comprises at least one pressure sensor, an alert interface and a controller. The method comprises activating said tree felling wedge in a tree felling monitoring mode, detecting a pressure level, detecting a release in said pressure level indicating the falling of a tree, and in response thereto providing an alert through said alert interface.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
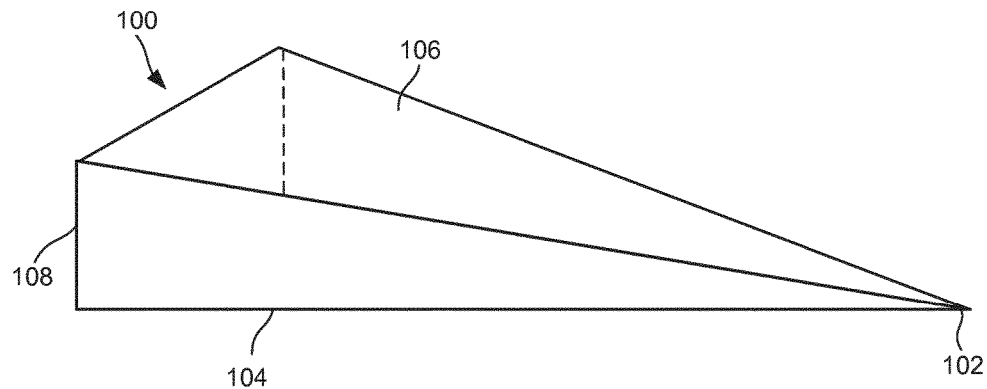
FIGS. 1a-b each shows a schematic illustration of a tree felling wedge according to an example embodiment of the teachings herein.
Figure 1B:
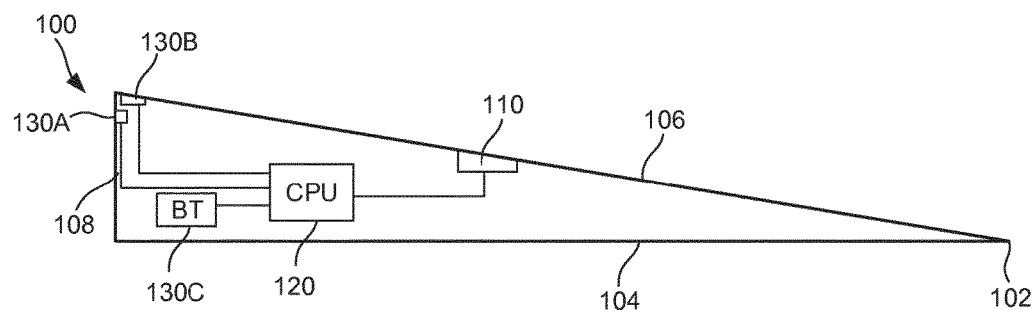

FIG. 1a-b each shows a schematic illustration of a tree felling wedge 100 according to an example embodiment of the teachings herein; the tree felling wedge 100 comprising two separating sides 104, 106, i.e. the sides 104, 106 of the tree felling wedge 100 that will engage the tree when being inserted forcing the upper and lower part of the tree trunk to separate urging the tree to fall substantially in a wanted direction. The force is applied to the striking side 108 of the tree felling wedge 100, which is arranged opposite to the end point 102. FIG. 1a shows the tree felling wedge and its upper 106 and lower part 104 as well as the striking side 108 and end point 102 in a perspective view. At least one pressure sensor 110 is arranged on a separating side of the tree felling wedge 100, as shown in FIG. 1b In the example shown, the pressure sensor is arranged on an upper separating side 106. However, it should be noted that a pressure sensor 110 may also—or alternatively be placed on a lower separating side 104 of the tree felling wedge 100 (not shown). The upper side 106 being the side that when the tree felling wedge 100 is used (for normal tree felling) the upper side 106 faces away from the ground, and, the lower side 104 being the side that faces towards the ground. The striking side 108 is arranged on opposite side of the end point 102 of the wedge 100.

The pressure sensor 110 is arranged to sense an increase in pressure as the tree felling wedge 100 is driven into a felling cut. A pressure sensor 110 arranged on an upper separating side 106 will not need to take account of the weight of the tree felling wedge 100 when detecting the pressure during use. However, due to the high pressure that will be exerted on the tree felling wedge 100 as it is driven into the felling cut, a tree felling wedge 100 may be used in any orientation irrespective of whether the pressure sensor(s) 110 is arranged on an upper 106 or lower 104 separating side or both. The description herein will focus on the exemplary arrangement of arranging the pressure sensor(s) 110 on an upper side 106.

Figure 2:
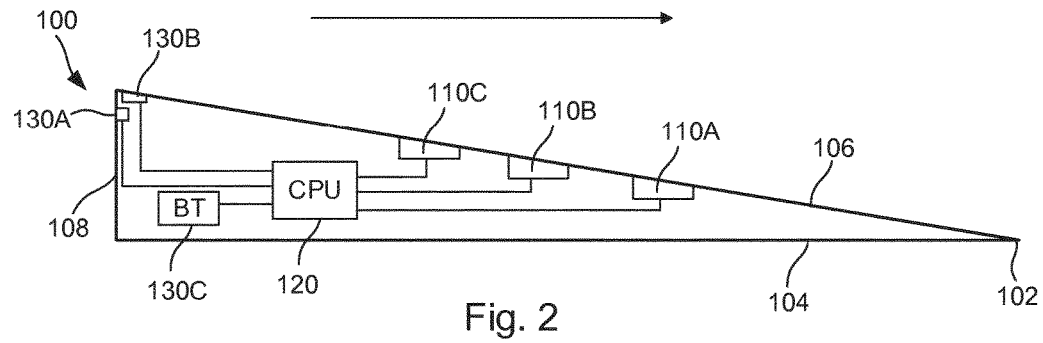
FIG. 2 shows a schematic illustration of a tree felling wedge according to an example embodiment of the teachings herein.

FIG. 2 shows a schematic illustration of a tree felling wedge 100 according to an example embodiment of the teachings herein; wherein three pressure sensors 110A, 110B and 110C are arranged on an upper side 106. The three pressure sensors 110A-C are arranged in order with a first pressure sensor 110A being arranged in a forwards direction, se arrow in FIG. 2, forward being the direction at which the tree felling wedge 100 will be driven into a felling cut when in use, a second pressure sensor 110B behind the first, and lastly a third pressure sensor 110C. When in use the first pressure sensor 110A will be the first to contact the tree and thus be the first to detect the pressure increase. Thereafter the second pressure sensor 110B will detect the pressure increase and the third pressure sensor 110C will be the last to detect the pressure increase.

The tree felling wedge 100 further comprises a controller 120 (CPU) operatively connected to the pressure sensor(s) 110. The controller 120 may be a part of the pressure sensor(s) or it may be a standalone circuit. The controller 120 may be implemented as one or several processors, controlling different or overlapping tasks. The actual arrangement of the controller 120 can be made in many different ways as would be understood by a skilled person and will not be discussed in greater detail. The controller 120 (CPU) is also operatively connected to an alerting interface 130. The alerting interface may comprise a loudspeaker or buzzer 130A for providing an audible alert, a Light Emitting Diode (LED) or other light source 130B for providing a visible alert and/or a radio frequency communication interface 130C, such as a device operating according to the Bluetooth™ standard for providing an alert to or through an external device (not shown in FIG. 1 or 2, but exemplified through ear or hearing protections, such as ear muffs or headsets, 160 in FIG. 6). It should be noted that any combination of alert interfaces may be used according to the teachings herein, for example both audible and visible, both audible and through radio frequency communication, both visible and through radio frequency communication and audible, visible and through radio frequency communication.

Figure 3:
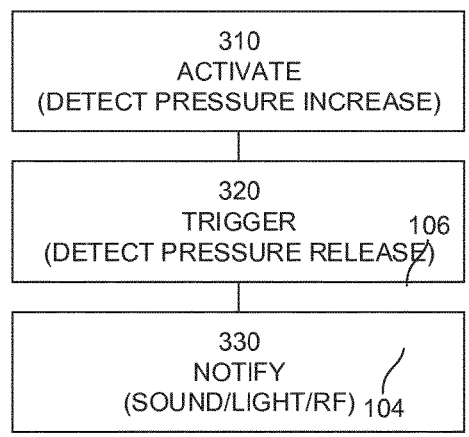
FIG. 3 shows a flowchart for a method according to an example embodiment of the teachings herein.

FIG. 3 shows a flowchart for a method according to an example embodiment of the teachings herein; wherein a tree felling wedge 100 is firstly activated 310. The tree felling wedge 100 may be activated through the use of a switch and/or it may be activated as the pressure sensor(s) 110 detects a pressure increase, possibly exceeding a predefined threshold level. The controller 120 may be configured to only detect the activating pressure increase if the detected pressure increase is to a sustained level. This avoids the tree felling wedge 100 to be activated when for example being bumped or dropped. Alternatively or additionally, the tree felling wedge 100 may be activated as it detects that it is being hammered into a felling cut, more on this in relation to FIG. 7. As the tree felling wedge 100 has been activated, it monitors the pressure through the pressure sensor(s) 110, and as a pressure decrease is detected—indicating that the tree is falling as the upper part of the tree trunk is no longer exerting any pressure on the pressure sensor 110—a trigger is generated 320 by the controller 120 or generated by the pressure sensor 110 and sent to the controller 120. As the controller 120 receives such a trigger, it notifies 330 the operator by providing an alert through activating the alert interface.

In one embodiment the controller 120 (CPU) may be configured to reset any ongoing alert should a new activation be detected. In this manner an alert may be cancelled by, for example pressing an activation button.

Figure 4:
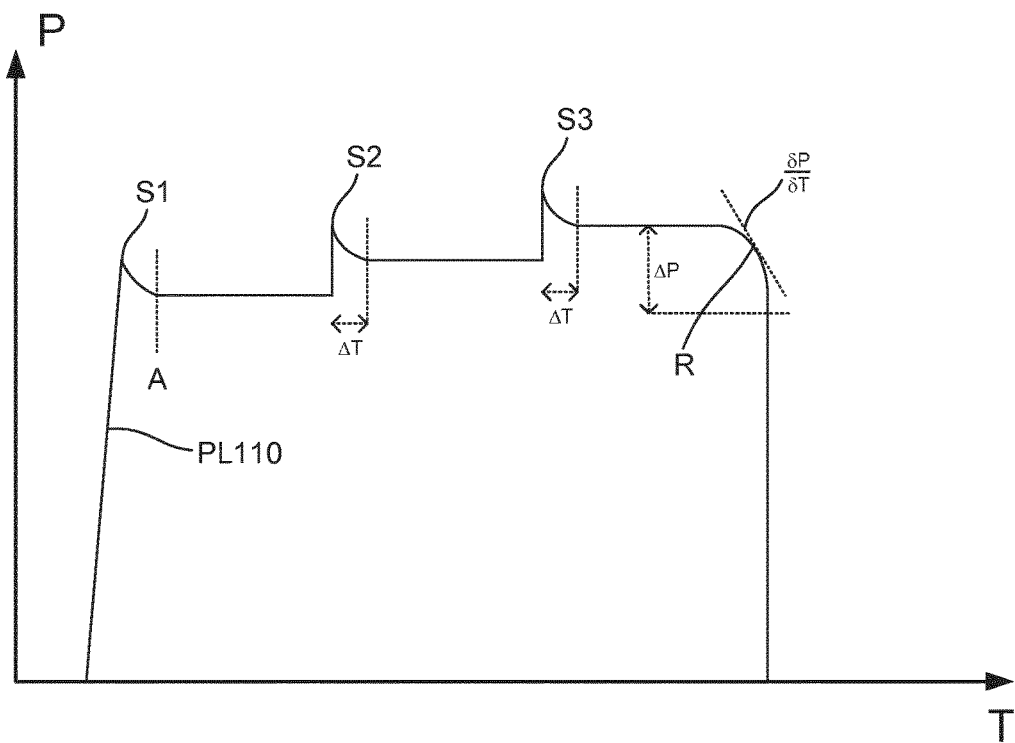
FIG. 4 shows a diagram for a pressure-time relation illustrating the operation of a tree felling wedge according to one embodiment of the teachings herein.

FIG. 4 shows a diagram for a pressure (P) vs time (T) relation illustrating the operation of a tree felling wedge 100 according to one embodiment of the teachings herein, wherein a pressure line PL 110 is shown. The pressure line PL 110 corresponds (schematically for illustrative purposes) to the pressure sensed by the corresponding pressure sensor 110 (not accounting for any base pressure, such as caused by the weight of the tree felling wedge 100). As the tree felling wedge 100 is driven into the felling cut, the pressure increases rapidly as noted by the peak S1 (for strike 1). In one embodiment, this rapid pressure increase may be used to activate the tree felling wedge 100 in a tree felling monitoring mode, whereby the tree felling wedge monitors whether a tree is being felled or not using the one or more pressure sensor(s). The wedge 100 may be activated by detecting a pressure that is greater than a predetermined threshold pressure level. When the tree felling wedge 100 is in an active tree felling monitoring mode the controller 120 (CPU) starts to monitor the pressure level(s) detected by the pressure sensor(s) 110. This activation is indicated A in FIG. 4. As further strikes are directed at the tree felling wedge 100, the pressure increases (or remains on the same level) for each strike (as denoted by S2 and S3).

In one embodiment the controller 120 (CPU) may be configured to detect a pressure decrease, indicating a release R of the tree felling wedge 100 indicating that the tree is falling, by determining that the pressure level has fallen by a threshold amount ΔP. In one such embodiment, the threshold amount is absolute, such as by 5 bars. In an alternative or combined embodiment, the threshold amount is relative, such as by 10%.

In an alternative or combined embodiment the pressure decreased is determined by measuring when a pressure that is less than a threshold pressure level.

In an alternative or combined embodiment the controller 120 (CPU) may be configured to detect a pressure decrease, indicating a release R of the tree felling wedge 100, by determining that the pressure level is decreasing at a rate exceeding a rate threshold δP/δT.

As the force of a strike to the tree felling wedge 100 diminishes, and the tree has separated slightly and then settles on the tree felling wedge 100, the pressure can decrease slightly. To account for this, the controller 120 (CPU) may be configured to not detect a pressure decrease until a short time ΔT has lapsed, such as 10 ms.

As a pressure decrease is detected, the controller notifies the operator by providing an alert.

Figure 5:
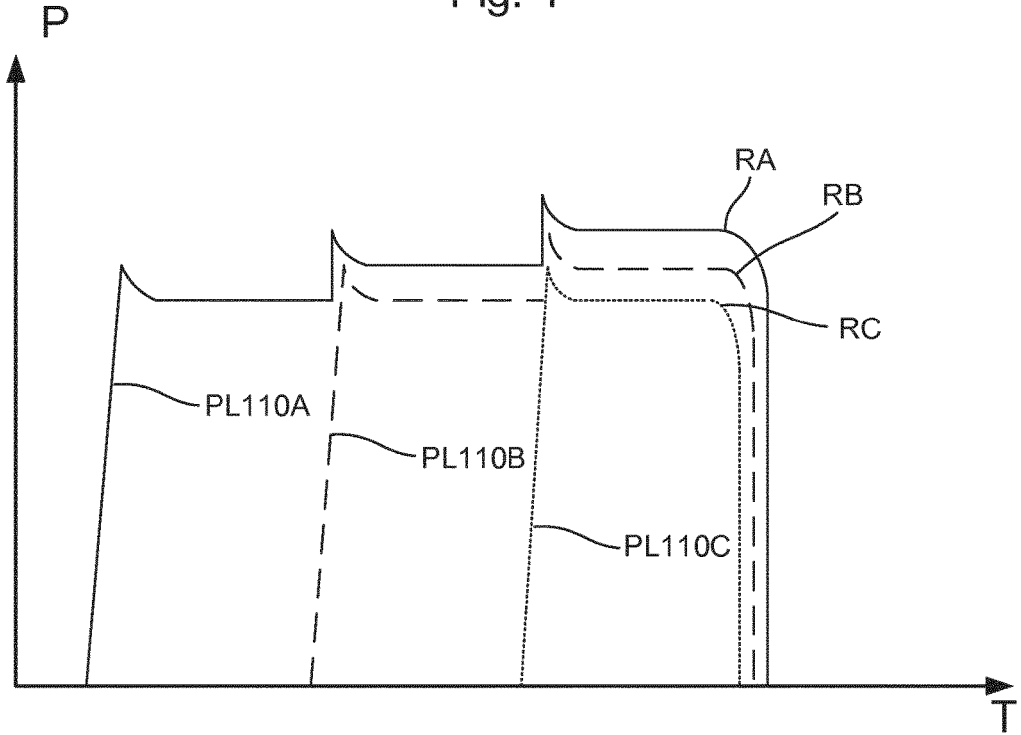
FIG. 5 shows a diagram for a pressure-time relation illustrating the operation of a tree felling wedge according to one embodiment of the teachings herein.

FIG. 5 shows a diagram for a pressure (P) vs time (T) relation illustrating the operation of a tree felling wedge 100 according to one embodiment of the teachings herein; wherein three pressure lines PL110A, PL110B and PL110C corresponding to the first, the second and the third pressure sensors 110A-C of the tree felling wedge 100 of FIG. 2 are shown. As can be seen, the first pressure sensor 110A first detects the pressure increase, thereafter the second pressure sensor 110B detects a pressure increase and lastly the third pressure sensor 110C detects the pressure increase. In the example of FIG. 5, each pressure sensor detects the pressure increase as a further strike is directed at the tree felling wedge 100. However, it should be noted that any number of pressure sensor(s) 110 may detect a pressure increase for each strike, depending on how hard the strike is.

In one embodiment the controller 120 (CPU) may be configured to detect a pressure decrease, indicating a release R of the tree felling wedge 100 indicating that the tree is falling, by determining that the pressure levels of all or at least a majority of the corresponding pressure sensors 110A-C are decreasing.

As the tree starts to fall, the pressure sensor 110 being the furthest from the end point 102 of the tree felling wedge 100, in the example of FIGS. 2 and 5 this will be the third pressure sensor 110C will first detect a decrease in pressure, indicated by the drop in the corresponding pressure line PL110C as indicated by the release RC. This will shortly thereafter be followed by releases for the other pressure sensor(s). Similar, the second pressure sensor 110B will detect a decrease in pressure, indicated by the drop in the corresponding pressure line PL110B as indicated by the release RB and correspondingly the first pressure sensor 110A will detect a decrease in pressure, indicated by the drop in the corresponding pressure line PL110A as indicated by the release RA.

In one embodiment the controller 120 (CPU) may thus be configured to detect a pressure decrease, indicating a release R of the tree felling wedge 100 indicating that the tree is falling, by determining that the pressure levels of the corresponding pressure sensors 110A-C are decreasing in reverse order, from when they detected the pressure increase. Should for example the first pressure sensor 110A detect a pressure release whilst the two remaining pressure sensors do not detect a pressure release, this may simply be a result of that the tree felling wedge 100 has been driven into a cutout.

The trigger can be any one or more of the pressure releases RA, RB, RC. For example, in one embodiment, the trigger occurs in response to RC alone. In another embodiment, the trigger only occurs after RC and RB. In still another embodiment, the trigger only occurs after RC, RB, and RA have happened, possibly within a predetermined time from start to finish.

By being able to detect when a tree is falling and then generating an alert, the safety in an area around the tree being felled is increased as warnings are given irrespective of the logsman's attention.

Figure 6:
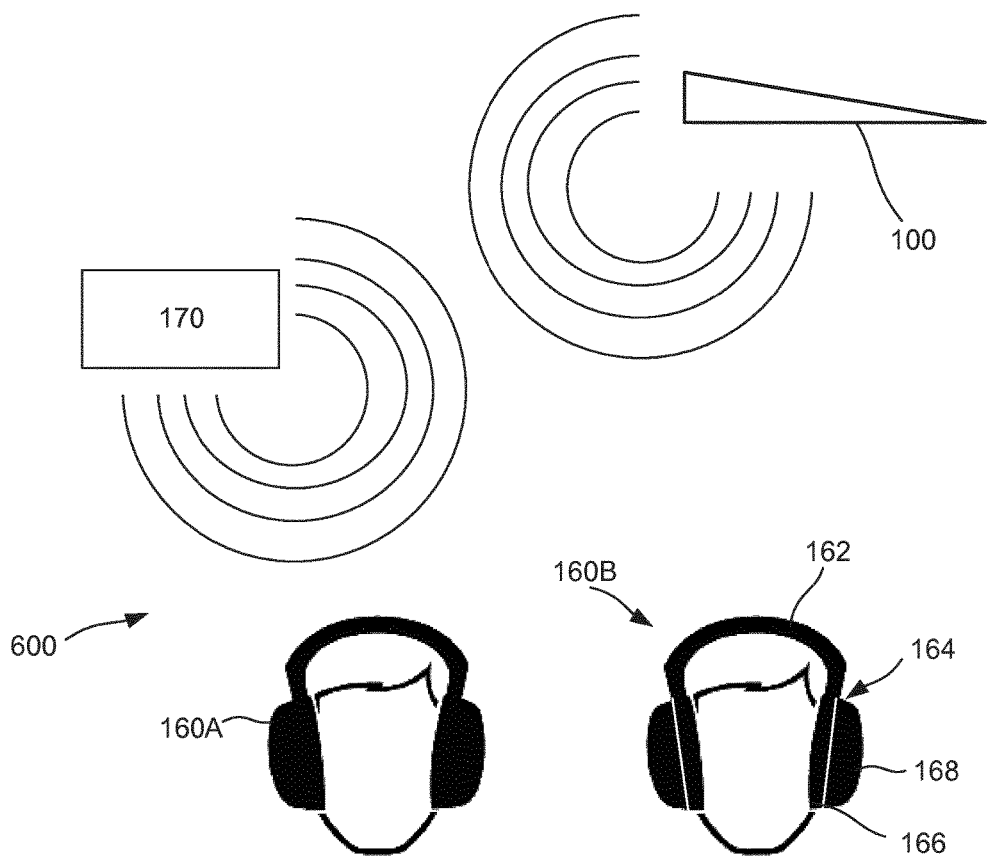
FIG. 6 shows a schematic illustration of a tree felling wedge system according to an example embodiment of the teachings herein.

FIG. 6 shows a schematic illustration of a tree felling wedge system 600 according to an example embodiment of the teachings herein. The tree felling wedge system 600 comprises at least one tree felling wedge 100 having a radio frequency alert interface 130C as per FIG. 1 or FIG. 2. The radio frequency alert interface 130C is configured to be communicatively connected to an external device.

In one embodiment the external device is an ear or hearing protection, such as an ear muff or a headset, 160A-B. The earmuff 160B or headset may comprise a generally U-shaped means 162 adapted to be worn around the top of the head of a user. The U-shaped means may be an adjustable headband 162. The headband 162 may comprise a resilient band or a strip made of plastic or rubber having adjustable buckles or other adjustable means. When applied to the head of the user, the headband 162 applies pressure on both sides of the head in order to ensure a secure fit. The headband may have an inner surface, facing the head, which is covered in a soft cushion material. Furthermore, the earmuff 160B comprises a pair of earmuff cup assemblies 164 connected to the headband 162. Each of the earmuff cup assemblies 164 comprises a rigid cup 168 and a sound absorbing layer 166. The sound absorbing layer 166 has a shape such that it generally fits the earmuff cup 168. The sound absorbing layer 222 comprises a sound-absorbing material and may be in the shape of a cushion. The sound-absorbing material may for example be foam or an nonwoven material such as a nonwoven fabric. The earmuff may further comprise a microphone, a controller, a transceiver, internal speaker, and/or a power source such as batteries. The earmuff 160B may further comprise an audio input, an on/off switch and/or a power indicator. The earmuff is a "smart" earmuff which is capable of receiving a signal from the tree felling wedge 100 and in response thereto sounding an alert within the earmuff cup assemblies, i.e. using an internal speaker of the earmuff device.

In another embodiment that the external device is a mobile phone, smart watch, safety glasses or similar.

The radio frequency alert interface 130C may be connected to more than one external device, so that alerts may be given to more than one person, thereby increasing the safety in the general area around the tree being felled, especially when persons are wearing ear protections 160.

In one embodiment the alerts are sent to that or those external device(s) which are positioned within predetermined distance of the felling wedge. This distance may for example be 150 feet, i.e. 46 meters, from the felling wedge.

In one embodiment the alerts are sent to that or those external device(s) that are operably connected to the felling wedge. Here operably connected is denoted as being coupled, synced, or otherwise linked to each other, for example via Bluetooth.

The radio frequency alert interface 130C may be connected directly to the ear protections 160A and 160B or through a router 170. The router may also be connected to a server (not shown) keeping track of the tree felling activities. For example, if the tree felling wedge 100 is arranged with a location finding device, such as a GPS, the server may determine which trees or where trees have been felled, and in any case how many trees that have been felled and at what rate.

Figure 7:
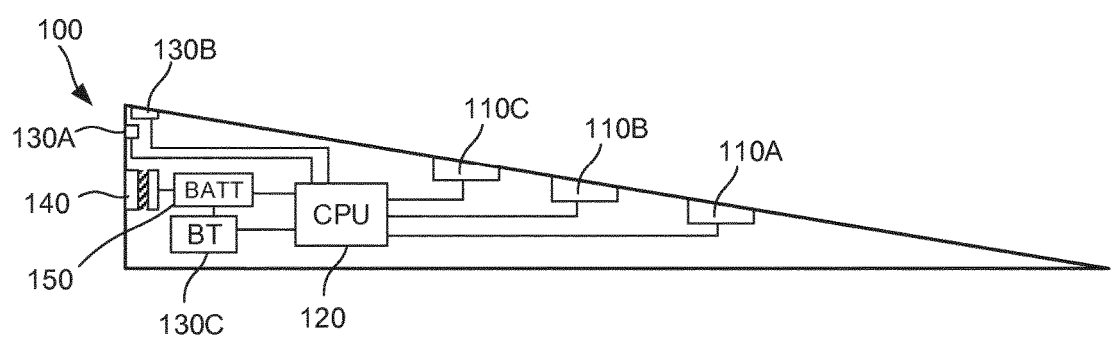
FIG. 7 shows a schematic illustration of a tree felling wedge according to an example embodiment of the teachings herein.

FIG. 7 shows a schematic illustration of a tree felling wedge 100 according to an example embodiment of the teachings herein. The tree felling wedge 100 may be any of the tree felling wedges 100 of FIG. 1 or 2. The tree felling wedge is further arranged with a strike activator 140 detecting the strikes being exerted on the tree felling wedge 100. This strike activator may be configured to detect a strike so as to activate the tree felling wedge 100 as was discussed in relation to the method being shown in FIG. 3. The strike activator 140 may also or alternatively be configured to absorb some of the power of a strike and deliver this as a charging current to a battery BATT powering the CPU and/or the pressure sensor(s) 110, and/or one or more components of the alert interface 130.

The strike activator 140 may be a spring-based coil and magnetic core arrangement for generating an electric current. The strike activator 140 may also be a piezoelectric arrangement for generating an electric current.

In this manner, the tree felling wedge 10 may be self sufficient when it comes to its power supply.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A tree felling wedge comprising at least one pressure sensor, an alert interface and a controller, wherein said controller is configured to:
   activate said tree felling wedge in a tree felling monitoring mode;
   detect a pressure level;
   detect a release in said pressure level indicating the falling of a tree; and
   in response thereto provide an alert through said alert interface.

2. The tree felling wedge of claim 1, wherein said controller is further configured to
   detect said release by determining that the pressure level has fallen by a threshold amount.

3. The tree felling wedge of claim 1, wherein said controller is further configured to
   detect said release by determining that the pressure level is decreasing at a rate exceeding a rate threshold.

4. The tree felling wedge of claim 1, wherein said controller is further configured to activate said tree felling wedge by detecting a pressure that is greater than a threshold pressure level.

5. The tree felling wedge of claim 1, wherein said controller is further configured to activate said tree felling wedge by detecting a rapid pressure increase, wherein the increase is above a threshold level.

6. The tree felling wedge of claim 1, wherein said controller is further configured to activate said tree felling wedge by detecting a pressure increase to a pressure level exceeding a threshold pressure level.

7. The tree felling wedge of claim 1, comprising more than one pressure sensor, wherein the controller is further configured to detect the release by determining a release in all or at least a majority of the corresponding pressure sensors.

8. The tree felling wedge of claim 7, wherein said controller is further configured to detect the release by detecting a release for the corresponding pressure sensors in a specific order.

9. The tree felling wedge of claim 8, wherein said controller is further configured to activate the tree felling wedge based on the strike activator detecting a strike.

10. The tree felling wedge of claim 1, wherein said controller is further configured to start detecting a release after a time has lapsed.

11. The tree felling wedge of claim 1, wherein said controller is further configured to reset any ongoing alert should a new activation be detected.

12. The tree felling wedge of claim 1, further comprising a strike activator configured to detect strikes being exerted on the tree felling wedge, wherein said strike activator is configured to absorb power from a strike and deliver the power from the strike as a charging current to a battery.

13. The tree felling wedge of claim 1, further comprising a strike activator configured to detect strikes being exerted on the tree felling wedge, wherein said controller is further configured to activate the tree felling wedge based on the strike activator detecting a strike.

14. A tree felling alert system comprising at least one tree felling wedge according to claim 1, said tree felling wedge comprising a radio frequency interface as part of the alert interface and said tree felling alert system further comprising an external device comprising a radio frequency interface for communicatively connecting said tree felling wedge for receiving the alert.

15. A method for use in a tree felling wedge comprising at least one pressure sensor, an alert interface and a controller, wherein said method comprises:
   activating said tree felling wedge in a tree felling monitoring mode;
   detecting a pressure level;
   detecting a release in said pressure level indicating the falling of a tree; and
   in response to detecting the release in said pressure level, providing an alert through said alert interface.

* * * * *